(12) United States Patent
Ishihara

(10) Patent No.: US 8,997,126 B2
(45) Date of Patent: Mar. 31, 2015

(54) COMPUTER-READABLE STORAGE MEDIUM HAVING INFORMATION PROCESSING PROGRAM STORED THEREIN, INFORMATION PROCESSING APPARATUS, INFORMATION PROCESSING METHOD, AND INFORMATION PROCESSING SYSTEM FOR CONDUCTING COMMUNICATION BETWEEN INFORMATION PROCESSING APPARATUSES AND CONTROL OF EXECUTION OF PREDETERMINED PROCESSING BASED ON THE COMMUNICATION RESULT

(71) Applicant: Nintendo Co., Ltd., Kyoto (JP)

(72) Inventor: Susumu Ishihara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/775,350

(22) Filed: Feb. 25, 2013

(65) Prior Publication Data

US 2013/0263154 A1 Oct. 3, 2013

(30) Foreign Application Priority Data

Mar. 27, 2012 (JP) ................................. 2012-072177

(51) Int. Cl.
*G06F 13/00* (2006.01)
*G06F 9/46* (2006.01)
*H04W 4/02* (2009.01)
*H04W 76/02* (2009.01)
*H04L 29/06* (2006.01)

(52) U.S. Cl.
CPC ................ *G06F 9/465* (2013.01); *H04W 4/02* (2013.01); *H04W 76/023* (2013.01); *H04L 29/06034* (2013.01); *A63F 2300/204* (2013.01); *A63F 2300/307* (2013.01); *A63F 2300/402* (2013.01); *A63F 2300/408* (2013.01); *A63F 2300/5573* (2013.01); *A63F 2300/69* (2013.01); *H04W 4/023* (2013.01)
USPC ........................................................ 719/329

(58) Field of Classification Search
CPC .................................................... G06F 9/4443
USPC ........................................................ 719/329
See application file for complete search history.

(56) References Cited

U.S. PATENT DOCUMENTS

| | | | |
|---|---|---|---|
| 7,491,124 B2 * | 2/2009 | Tanaka et al. | 463/42 |
| 8,591,342 B2 * | 11/2013 | Takahashi et al. | 463/42 |
| 2010/0325235 A1 | 12/2010 | Konno et al. | |
| 2012/0102028 A1 * | 4/2012 | Nakata et al. | 707/736 |
| 2013/0244579 A1 * | 9/2013 | Hohteri et al. | 455/41.2 |

FOREIGN PATENT DOCUMENTS

JP 2011-309 1/2011

* cited by examiner

*Primary Examiner* — Andy Ho
(74) *Attorney, Agent, or Firm* — Nixon & Vanderhye PC

(57) ABSTRACT

Object data that can be used in a predetermined application is previously stored in the information processing apparatus. The information processing apparatus makes communication with another unspecified information processing apparatus that is within a predetermined range. When object data that can be used in the predetermined application is received by the communication, an object based on the object data having been received is caused to appear in a virtual space, and when object data that can be used in the predetermined application is not received by the communication an object based on the previously stored object data is caused to appear in the virtual space.

20 Claims, 6 Drawing Sheets

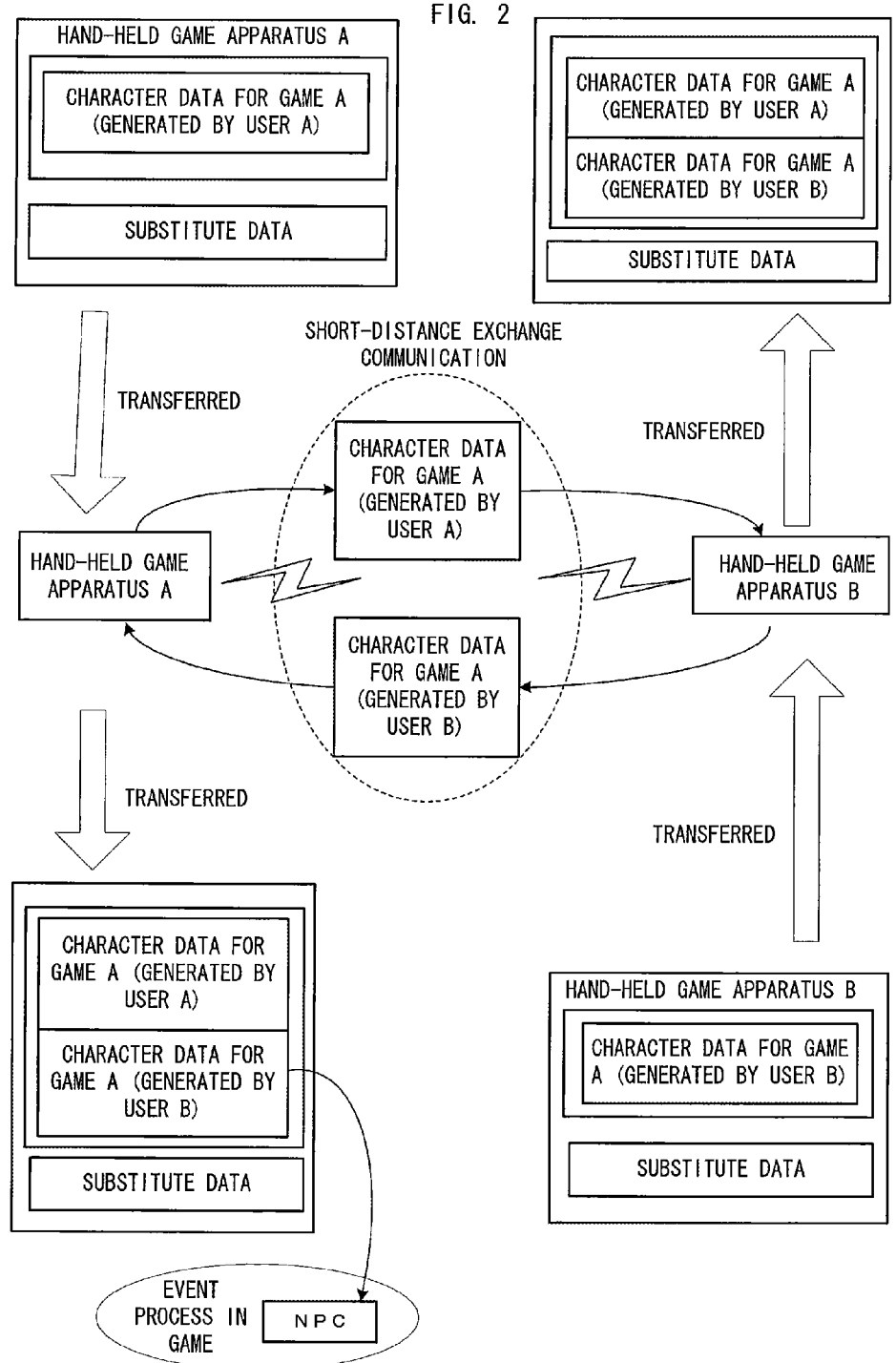

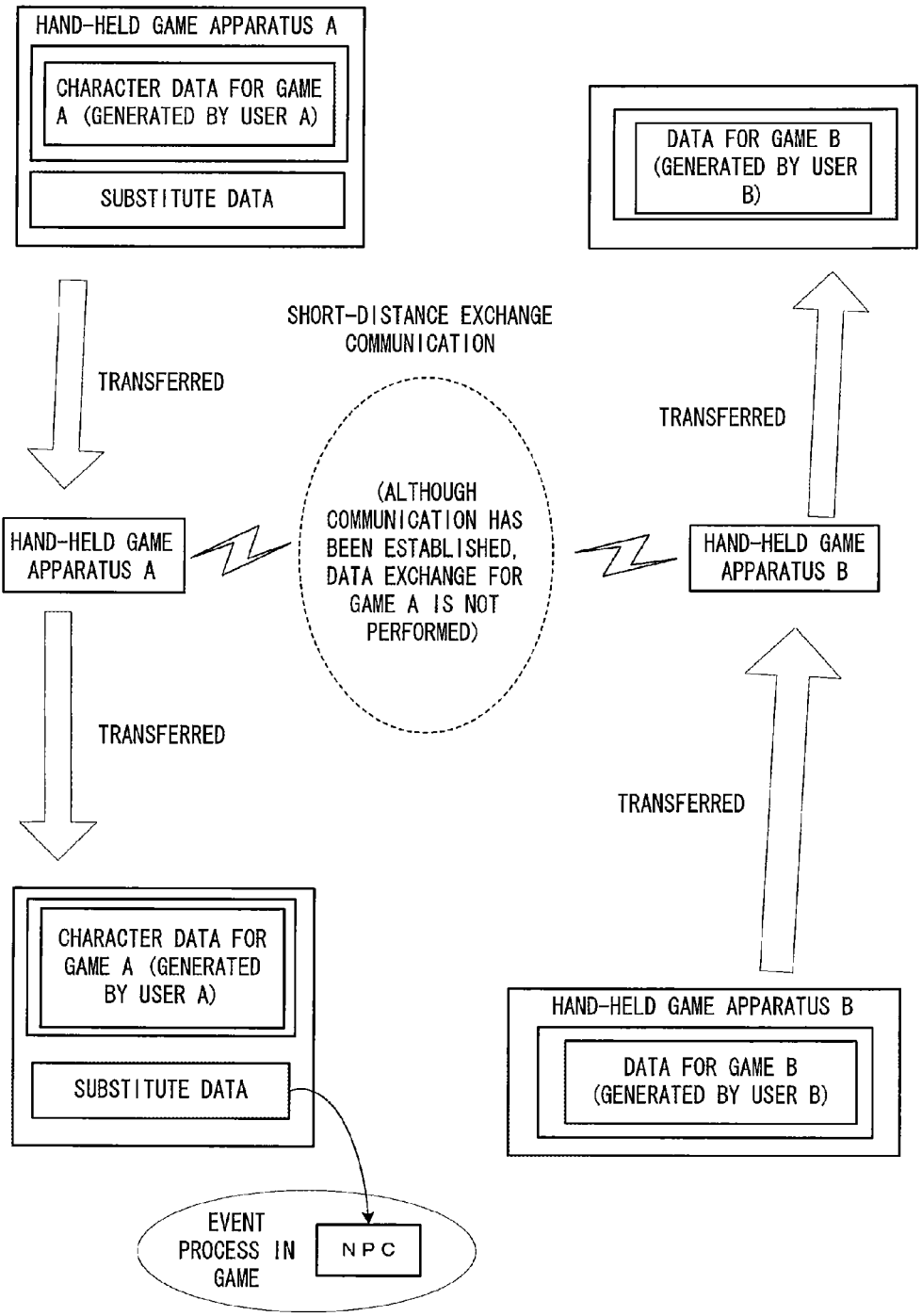

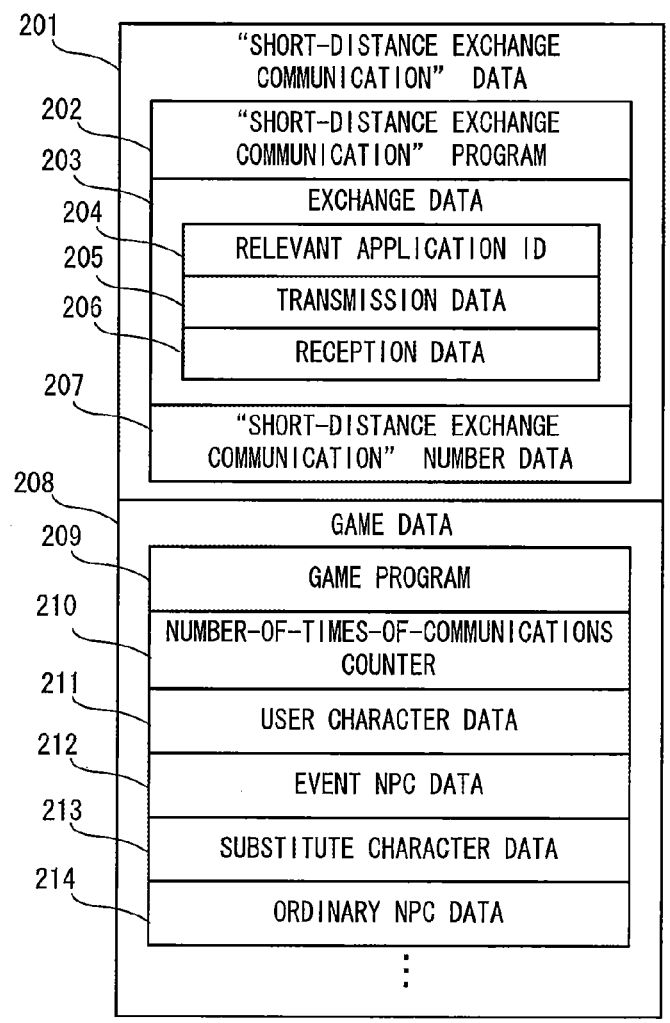

COMPUTER-READABLE STORAGE MEDIUM HAVING INFORMATION PROCESSING PROGRAM STORED THEREIN, INFORMATION PROCESSING APPARATUS, INFORMATION PROCESSING METHOD, AND INFORMATION PROCESSING SYSTEM FOR CONDUCTING COMMUNICATION BETWEEN INFORMATION PROCESSING APPARATUSES AND CONTROL OF EXECUTION OF PREDETERMINED PROCESSING BASED ON THE COMMUNICATION RESULT

CROSS REFERENCE TO RELATED APPLICATION

The disclosure of Japanese Patent Application No. 2012-72177, filed on Mar. 27, 2012, is incorporated herein by reference.

FIELD

The exemplary embodiments relate to information processing performed by information processing apparatuses having communication function, and more particularly to communication between the information processing apparatuses, and control of execution of predetermined processing based on the communication results

BACKGROUND AND SUMMARY

Systems that use short-distance wireless communication and that are capable of providing, to other information processing apparatuses, data which can be used in an application regardless of whether or not the application is executed, have been known to date.

Therefore, a feature of the exemplary embodiments is to make available a computer-readable storage medium having stored therein an information processing program that allows enhancement of users' experiences in communication within a predetermined range, and the like.

In order to attain the aforementioned object, for example, the following features are implemented.

A feature of the exemplary embodiment provides a computer-readable storage medium having stored therein an information processing program that causes a computer of an information processing apparatus to function as: an object data storing section; a communication section; a communication execution determination section; and a controller. The object data storing section is configured to store object data that can be used in a predetermined application. The communication section is configured to make communication with another unspecified information processing apparatus that is within a predetermined range, by using the communication function. The communication execution determination section is configured to determine whether or not the communication with the other unspecified information processing apparatus that is within the predetermined range has been made by the communication section. The controller is configured to perform control in a case where the communication execution determination section determines that the communication with the other information processing apparatus has been made such that, when object data that can be used in the predetermined application is received by the communication, an object based on the object data having been received is caused to appear in a virtual space, and when object data that can be used in the predetermined application is not received by the communication, an object based on the object data previously stored in the object data storing section is caused to appear in the virtual space.

According to another feature of the exemplary embodiment, the communication section may include a searching section configured to search for another unspecified information processing apparatus that is within the predetermined range, by using the communication function, and the communication execution determination section may determine whether or not communication with the other information processing apparatus that has been found by the searching section has been made.

According to another feature of the exemplary embodiment, the information processing program causes the computer to further function as an execution data storing section configured to store, in a predetermined storage medium, first information indicating whether or not the communication has been made, and second information indicating whether or not data that can be used in the predetermined application has been received from a communication partner of the communication having been made. Further, the communication execution determination section may determine, based on the first information, whether or not the communication with the other information processing apparatus has been made, and the controller may determine, based on the second information, whether or not object data that can be used in the predetermined application has been received.

According to still another feature of the exemplary embodiment, the first information may represent data indicating the number of times the communication with the other information processing apparatus has been made, and the second information may indicate whether or not the object data has been received.

According to still another feature of the exemplary embodiment, the controller may not cause an object to appear in the virtual space when the communication execution determination section does not determine that the communication with the other information processing apparatus has been made.

According to still another feature of the exemplary embodiment, the object data storing section may previously store data of a first object that is caused to appear in the virtual space by the predetermined application being executed, and data of a second object that does not appear in the virtual space by the predetermined application being simply executed, and the controller may cause the second object to appear in the virtual space when the communication execution determination section determines that the communication with the other information processing apparatus has been made, and object data that can be used in the predetermined application has not been received by the communication.

According to still another feature of the exemplary embodiment, objects that appear in the virtual space may be classified into a first type of objects that appear in the virtual space by the predetermined application being executed regardless of a determination result from the communication execution determination section, and a second type of objects that do not appear in the virtual space by the predetermined application being simply executed. Further, the controller may cause the second type of objects to appear in the virtual space based on the object data having been received, or the object data previously stored in the object data storing section, when the communication execution determination section determines that the communication with the other information processing apparatus has been made.

According to still another feature of the exemplary embodiment, the object data received by the communication may be object data generated by a user, and the objection data previously stored in the object data storing section may be preset object data that is different from the object data generated by the user.

The information processing program can be stored in any computer-readable storage medium such as flexible disks, hard disks, optical discs, magneto-optical disks, CD-ROMs, CD-Rs, magnetic tapes, semiconductor memory cards, ROMs, and RAMs.

According to the exemplary embodiment, even when data that can be used in a predetermined application cannot be obtained although communication process for data exchange has been executed, the same process as a process using the data that can be used in the predetermined application can be executed, thereby enabling enhancement of users' experiences.

These and other objects, features, aspects and advantages of the exemplary embodiments will become more apparent from the following detailed description when taken in conjunction with the accompanying drawings.

BRIEF DESCRIPTION OF THE DRAWINGS

FIG. 2 illustrates an outline of a non-limiting exemplary process according to the exemplary embodiment;

FIG. 3 illustrates an outline of a non-limiting exemplary process according to the exemplary embodiment;

FIG. 4 illustrates a non-limiting exemplary relationship between "short-distance exchange communication" and an event process;

FIG. 5 illustrates non-limiting exemplary programs and information stored in a main memory;

FIG. 6 is a flow chart showing a non-limiting exemplary process executed by a processor or the like.

DETAILED DESCRIPTION OF NON-LIMITING EXAMPLE EMBODIMENTS

Hereinafter, an exemplary embodiment will be described.

Figure 1:
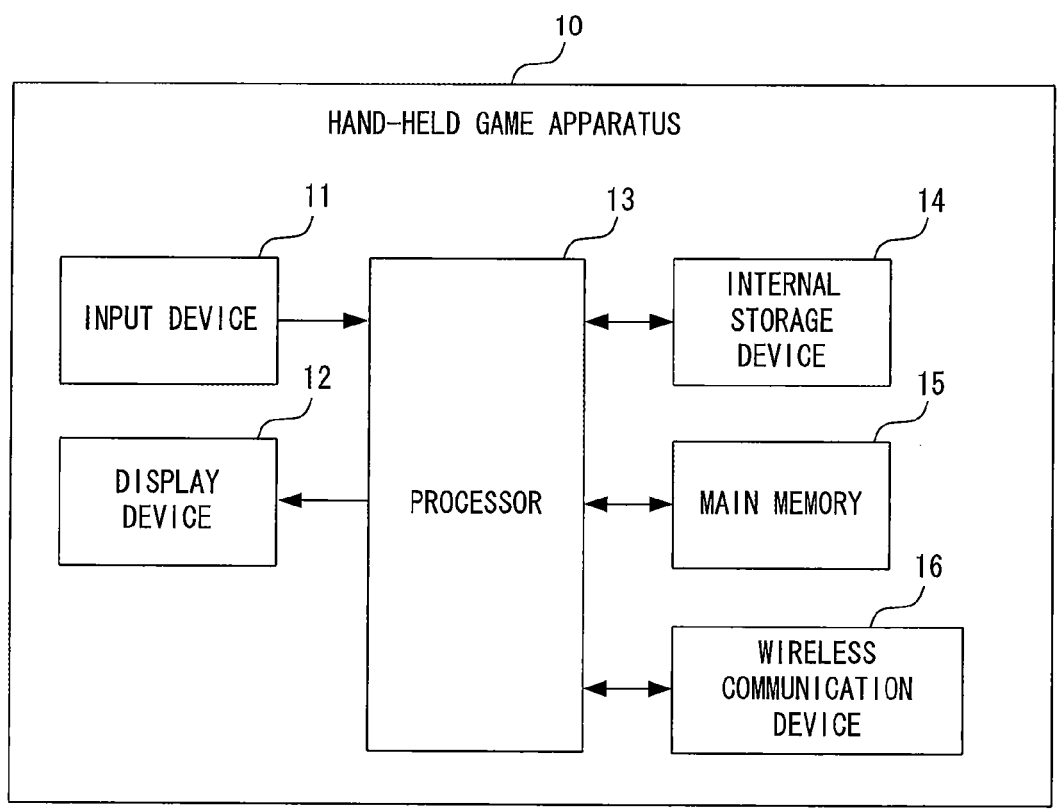
FIG. 1 is a block diagram illustrating a non-limiting exemplary configuration of a hand-held game apparatus 10.

In FIG. 1, a hand-held game apparatus 10 includes an input device 11, a display device 12, a processor 13, an internal storage device 14, a main memory 15, and a wireless communication device 16.

The input device 11 is operated by a user of the hand-held game apparatus 10, and outputs a signal according to the operation performed by the user. The input device 11 is implemented as, for example, a cross switch, a push button, and a touch panel. The display device 12 displays, on a screen, an image generated by the hand-held game apparatus 10. The display device 12 is typically implemented as a liquid crystal display device. In the internal storage device 14, computer programs executed by the processor 13 are stored. Further, in the internal storage device 14, data to be exchanged in "short-distance exchange communication" described below, is also stored. The internal storage device 14 is typically implemented as a flash EEPROM. The main memory 15 temporarily stores computer programs and information. The wireless communication device 16 transmits a signal to another hand-held game apparatus and receives a signal from another hand-held game apparatus, by wireless communication.

Hereinafter, an outline of an operation performed by the hand-held game apparatus 10 of the exemplary embodiment will be described.

Firstly, in the exemplary embodiment, the hand-held game apparatus 10 is able to exchange, by using the "short-distance exchange communication", data that can be used in a predetermined application (hereinafter, a predetermined game is described as an example thereof). In the description herein, the "short-distance exchange communication" refers to a communication for mutually transmitting and receiving predetermined data (hereinafter, referred to as "exchange data") stored in the internal storage device 14, between the hand-held game apparatus 10 and another unspecified hand-held game apparatus 10, by using the short-distance wireless communication. The "short-distance exchange communication" is made when, for example, users having the hand-held game apparatuses 10 with him/her pass by each other (that is, when both of the users are within a range in which the short-distance wireless communication can be mutually made). Further, the exchange data is generated based on a user's operation and the like, and is previously stored in a predetermined region in the internal storage device 14. The exchange data is, for example, character data (object data) that can be used as an NPC (non-player character) in the predetermined game, and the like.

In the exemplary embodiment, the exchange data is exchanged when data for the same game is stored in the internal storage devices 14. For example, a case is assumed where the users go out with the hand-held game apparatuses 10. In such a case, as shown in FIG. 2, in a case where both the hand-held game apparatuses A and B (users A and B) have character data for game A which is stored in the internal storage devices 14, the "short-distance exchange communication" is made when both of the users pass by each other, so that character data is mutually transmitted and received. On the other hand, in a case where only the game apparatus A has character data for game A stored therein (data for game A is not stored in the game apparatus B), although the "short-distance exchange communication" is made when both of the users pass by each other, character data for game A is not transmitted and received, as shown in FIG. 3. Namely, although the "short-distance exchange communication" has been made, the user A cannot obtain character data for game A which is generated by another user.

Thus, in the exemplary embodiment, for example, after the user has got home, if the exchange data for the predetermined game is obtained in a game process of the predetermined game which is executed based on a user's operation, as a result of the "short-distance exchange communication" having been made, an event process is executed by using the exchange data (see FIG. 2). On the other hand, if data for the predetermined game cannot be obtained although the "short-distance exchange communication" has been made, the event process is executed by using substitute data that is previously stored in the hand-held game apparatus 10 (see FIG. 3).

The event process is, for example, a process of causing a character generated by another user to appear as an NPC on a world map in an RPG or SLG (for example, appear as a traveling merchant). By performing a process of talking to the character in the game, for example, an item can be purchased from the character, or fighting with the character can be performed. Since the event process is executed according to the "short-distance exchange communication" having been made, the NPC does not appear in the game unless the "short-distance exchange communication" is made.

Further, the substitute data is data having a function equivalent to that of character data generated by the user, in other words, data usable as data of the NPC. The substitute data is, for example, data that is previously generated as a part of game data for the predetermined game (namely, data that is packed and preset as a part of game software). For example, a data format of the substitute data is the same as that of the character data generated by a user, and the substitute data enables, in the event process, execution of the same process (for example, a process of purchasing an item) as a process executed with the use of the character data obtained in the "short-distance exchange communication". In other words, the substitute data represents a character that is previously generated by a developer, and that is difficult to be distinguished, at a glance, from the character generated by a user.

FIG. 4 illustrates a non-limiting exemplary relationship between the "short-distance exchange communication" described above and the event process (in the predetermined game) in a form of a table. In the exemplary embodiment, the event process as described above can be executed when the "short-distance exchange communication" is made. When the exchange data (for the game in which the event process is executed) has been obtained, the exchange data is used for the event process, and when the exchange data has not been obtained, the event process is executed by using the substitute data.

As described above, in the exemplary embodiment, as a result of the "short-distance exchange communication" having been made, one of the exchange data or the substitute data is used, according to the communication result, to execute the event process (appearance of the NPC). Thus, in a case where, when a user has passed by another user with the hand-held game apparatus 10, although the "short-distance exchange communication" has been made, character data generated by the other user has not been obtained, (so that no NPC appears), the user is prevented from being disappointed, and further the frequency of occurrence of the event process as described above can be increased.

Next, an operation performed by the hand-held game apparatus 10 will be described in detail with reference to FIG. 5 to FIG. 7.

FIG. 5 illustrates non-limiting exemplary programs and information stored in the main memory 15 of the hand-held game apparatus 10.

"Short-distance exchange communication" data 201 includes a "short-distance exchange communication" program 202, exchange data 203, and "short-distance exchange communication" number data 207. The "short-distance exchange communication" data 201 is loaded from the internal storage device 14 into the main memory 15 as appropriate. The "short-distance exchange communication" program 202 is a program for executing the "short-distance exchange communication". The exchange data 203 includes a relevant application ID 204 that represents an application (game) relevant to the data, transmission data 205 that is data to be transmitted in the "short-distance exchange communication", and reception data 206 that is data received from another hand-held game apparatus 10 in the "short-distance exchange communication". Further, the "short-distance exchange communication" number data 207 represents the number of times the "short-distance exchange communication" has been made after the hand-held game apparatus 10 is powered on. When the hand-held game apparatus 10 is powered off, the "short-distance exchange communication" number data 207 is cleared (reset to 0).

Game data 208 includes various programs and data for executing the game process. The game data 208 may be loaded from the internal storage device 14 into the main memory 15, may be read from an external storage device and loaded into the main memory 15, or may be received from another hand-held game apparatus 10 or a server device, and loaded into the main memory 15.

A game program 209 is a program for executing the game process as described below. A number-of-times-of-communications counter 210 represents data in which the number of times the "short-distance exchange communication" is made is stored as a part of saved data of the game. The number-of-times-of-communications counter 210 and the "short-distance exchange communication" number data 207 are used for determining whether or not substitute character data 213 described below is to be used for the event process. User character data 211 represents a character generated by a user. The user character data 211 is copied to the transmission data 205, and can be registered as a subject to be exchanged between the hand-held game apparatus 10 and another hand-held-game apparatus 10. The substitute character data 213 is data having the same data format as the user character data 211, and represents a character which is previously generated by a game developer or the like. The number of the characters may be one or plural. Event NPC data 212 represents an NPC (hereinafter, referred to as an event NPC) that is caused to appear in the game as a part of the event process. The event NPC data 212 is generated based on the reception data 206 or the substitute character data 213. Further, the event NPC does not appear simply by an application being executed. For example, even if execution of the game is started, in a case where the "short-distance exchange communication" has never been made, the event NPC does not appear. In other words, the event NPC appears according to the "short-distance exchange communication" having been made.

In addition thereto, for example, ordinary NPC data 214 representing NPCs (hereinafter, referred to as ordinary NPCs) that can be caused to appear in the game by the game being executed regardless of whether or not the "short-distance exchange communication" has been made, is stored in the main memory 15.

Next, a flow of a "short-distance exchange communication" process executed by the processor 13 of the hand-held game apparatus 10 and the wireless communication device 16 cooperating with each other, will be described with reference to a flow chart of FIG. 6. The "short-distance exchange communication" process is executed as a background process when, for example, the game apparatus is in a so-called "sleep mode" (also referred to as a stand-by mode or the like in some cases). In the sleep mode, control is fundamentally performed such that, for example, the wireless communication device 16 is caused to primarily operate, and the sleep mode of the processor 13 is temporarily canceled as appropriate to temporarily cause the processor 13 to primarily operate (for example, the wireless communication device 16 performs a process of searching for another game apparatus, and the processor 13 performs data transmission and reception). Alternatively, for example, a second processor that can operate with low power consumption may be provided in addition to the processor 13, and the second processor may be caused to primarily operate in the sleep mode. Further, the "short-distance exchange communication" process may be executed as appropriate according to a user's instruction operation also in a state other than the "sleep mode".

Firstly, in step S1, a process of searching for another hand-held game apparatus 10 is executed. This process is executed by, for example, each hand-held game apparatus 10 repeating transmission of a beacon representing a connection request, and reception of the beacon. Next, in step S2, whether or not another hand-held game apparatus 10 is within a communication allowable range is determined according to the result of the searching process. For example, when a response signal in response to the transmitted beacon is received from another hand-held game apparatus 10 in a predetermined time period, or when the beacon is received from another hand-held game apparatus 10, the determination indicates an affirmative result.

When another hand-held game apparatus 10 is not within the communication allowable range (NO in step S2), the process is returned to step S1, and the process step is repeated. When another hand-held game apparatus 10 is within the communication allowable range (YES in step S2), a process of establishing a communication path for allowing the "short-distance exchange communication" to be made is executed in step S3. When the communication path is established, the transmission and reception of the relevant application ID 204 is performed, and whether or not the relevant application ID 204 is the same between the hand-held game apparatus 10 and the other hand-held game apparatus 10, is determined in step S4. Namely, whether or not the exchange data 203 of the same game is prepared in both of them, is determined. When the result of the determination indicates that the relevant application ID 204 is the same between both of them (YES in step S4), a process of transmitting the transmission data 205 and a process of storing, as the reception data 206, data transmitted from the other game apparatus are executed in step S5. On the other hand, when the relevant application ID 204 is not the same between both of them (NO in step S4), the process step of step S5 is skipped.

In step S6, the "short-distance exchange communication" number data 207 is incremented by one, and a process of cutting off the "short-distance exchange communication" is executed in step S7 subsequent thereto. Thereafter, the process is returned to step S1, and the process described above is repeated until, for example, the "sleep mode" is cancelled.

As another example of the process described above, a process of transmitting the relevant application ID 204 in a state where the relevant application ID 204 is contained in the beacon may be executed. In this case, the hand-held game apparatus having received the relevant application ID 204 contained in the beacon may determine whether or not the relevant application ID is the same as that of the hand-held game apparatus having transmitted the relevant application ID 204. Only when the relevant application ID is the same, the communication path establishing process (step S3) may be executed (namely, the process step of step S4 is executed before the process step of step S3). On the other hand, when the relevant application ID is not the same, the communication path establishing process is not executed, and the process may be advanced to step S6. This is for storing a record that passing-by has been performed although the communication has not been made. Namely, in the exemplary embodiment, the searching process is one aspect of the communication process.

Next, a flow of the game process executed by the processor 13 of the hand-held game apparatus 10 will be described with reference to a flow chart of FIG. 7. The game is, for example, an RPG and an event NPC appears on a world map (field map) based on the result of the "short-distance exchange communication". A player is allowed to, for example, purchase and sell an item by talking to the event NPC in the game. Further, the event NPC to which the player has talked is deleted from the world map after, for example, purchasing and selling the item has been ended.

Firstly, when execution of the game program 209 is started, the number X of times communication has been made is obtained with reference to the number-of-times-of-communications counter 210 in step S21. The number X of times communication has been made represents the number of times the "short-distance exchange communication" stored as a part of saved data of the game as described above has been made. Namely, by the data being loaded, the number of times the "short-distance exchange communication" has been made in and before the immediately preceding executions of the game, is obtained. Next, in step S22, a process of updating display of the world map of the game is executed. This is also a process of reflecting, on a screen display, a virtual game space in which the event NPC has been positioned in a process described below.

Next, in step S23, whether or not character data having been received from another hand-held game apparatus 10 is stored as the reception data 206 is determined with reference to the exchange data 203. In other words, whether or not transmission and reception of character data has been performed in the "short-distance exchange communication" is determined. When no character data is received as a result (NO in step S23), the process is advanced to step S27 described below. On the other hand, when character data has been received (YES in step S23), the character data is obtained by the reception data 206 being loaded in step S24. Next, in step S25, an event NPC is generated based on the character data, and is stored as the event NPC data 212. Further, the event NPC is positioned at a predetermined position on the world map. Next, in step S26, the reception data 206 based on which the event NPC has been generated is deleted.

Next, in step S27, the number Y of times the "short-distance exchange communication" has been made is obtained with reference to the "short-distance exchange communication" number data 207. The number Y of times represents the number of times the "short-distance exchange communication" has been made after the hand-held game apparatus 10 has been powered on. Next, in step S28, whether or not the "short-distance exchange communication" has been made and a character has been exchanged between the hand-held game apparatus 10 and another hand-held game apparatus 10, is determined. Specifically, the processor 13 determines whether or not the number X of times of communications is unequal to the number Y of times the "short-distance exchange communication" has been made, whether or not the number Y of times is greater than 0 (that is, greater than or equal to 1), and whether or not positioning of the event NPC is unexecuted in the most recent process loop. When the determinations indicate affirmative results (YES in step S28), the substitute character data 213 is obtained in step S29 (when character data corresponding to a plurality of characters is stored, data corresponding to one character is obtained at random). Next, in step S30, the event NPC data 212 is generated based on the obtained data, and the event NPC based on the data is positioned at a predetermined position on the world map.

On the other hand, when the determinations in step S28 indicate negative results (NO in step S28), the process steps of step S29 and step 30 are skipped.

Next, in step S31, a value of the number-of-times-of-communications counter 210 is updated so as to indicate a value of the "short-distance exchange communication" number data 207.

Next, in step S32, other various game processes are executed. For example, a process of generating a character based on a user's operation, a process of setting, as the transmission data 205, data representing the character, or a process of dealing with the event NPC (for example, purchasing and selling an item) is executed as appropriate. The process is then returned to step S22, and the process steps described above are repeated until a predetermined condition for ending the game is satisfied.

As described above, in the exemplary embodiment, when the event process of causing the event NPC to appear is executed, data based on which the NPC is generated is changed according to whether or not data that can be used in the game has been received by the "short-distance exchange communication". Thus, even in a case where, for example, although the "short-distance exchange communication" has been made, data that can be used in a predetermined game has not been received, the event process based on the "short-distance exchange communication" can be executed. Further, the substitute data can be used in the event process in the same manner as in a case where the received character data is used. Therefore, a user can feel as if the event NPC has been obtained from another user by the "short-distance exchange communication" regardless of whether or not character data has been actually transmitted and received. Thus, even in a case where, for example, although the hand-held game apparatuses 10 have been widespread, game software has not been widespread to the same degree, the event process can be executed in so far as the "short-distance exchange communication" is made. Further, a user can feel as if a character generated by another user appears, thereby enabling entertaining features of the game software to be enhanced. Further, as a result, a user is given an incentive to positively make the "short-distance exchange communication".

Further, since the event NPC does not appear in the game unless the "short-distance exchange communication" is made, a user is given an incentive to positively make the "short-distance exchange communication". Therefore, for example, the user can be motivated to have the hand-held game apparatus with him/her when the user goes out.

Further, regardless of whether an NPC is generated based on the reception data or an NPC is generated based on the substitute data, the same process (for example, purchasing and selling an item) can be executed in either case. Therefore, a user can be given increased opportunities of experiencing the process (the event process) executable in so far as the "communication" has been made without minding whether or not character data has been received from another hand-held game apparatus.

An amount of data that can be received from another hand-held game apparatus 10 may correspond to one character. Alternatively, an amount of data that can be received from another hand-held game apparatus 10 may correspond to plural characters. For example, in a case where the "short-distance exchange communication" has been made five times while a user goes out with the hand-held game apparatus 10, character data corresponding to one character may be received from each of five other hand-held game apparatuses 10, to obtain and store, as the reception data 206, the character data corresponding to five characters in total. In this case, data representing date and time when each data has been received, is also stored. In the game process, the five NPCs having been received may be caused to simultaneously appear on the world map, or, for example, the most recently received three NPCs may be caused to simultaneously appear on the world map, and, when the three NPCs are deleted from the world map after each NPC has talked to the user, the remaining NPCs which have not appeared yet, may be caused to appear.

Further, data to be transmitted may be data corresponding to one character. Alternatively, data to be transmitted may be data corresponding to plural characters.

Further, in the exemplary embodiment, the "short-distance exchange communication" is described as an exemplary communication manner used in the data exchange described above. However, the hand-held game apparatuses 10 apart from each other by a short distance may make communication in the following manner as well as by the "short-distance exchange communication". For example, in a case where each hand-held game apparatus 10 has a GPS mounted therein, each game apparatus transmits, to a predetermined server, positional information data obtained by the GPS, time information data representing date and time when the positional information data has been obtained, and the "exchange data". The server determines and extracts the hand-held game apparatuses 10 that have approached each other within a predetermined distance in a certain time zone, by using the positional information data and the time information data which have been transmitted from a plurality of game apparatuses. Namely, the server determines whether or not the game apparatuses 10 have approached each other within a range in which the short-distance communication as described above can be made (namely, whether or not the game apparatuses 10 "have passed by" each other), by using the positional information transmitted from each game apparatus 10. The "exchange data" may be transmitted via the server to each of the hand-held game apparatuses 10 determined to have "passed by" each other so as to exchange the "exchange data" between the hand-held game apparatuses 10. Further, in this manner, a current location may be calculated by using not only the GPS, but also, for example, electrically measured information (MAC address or radio field intensity) from a wireless LAN access point, and the location may be obtained and used as the positional information data.

Figure 6:
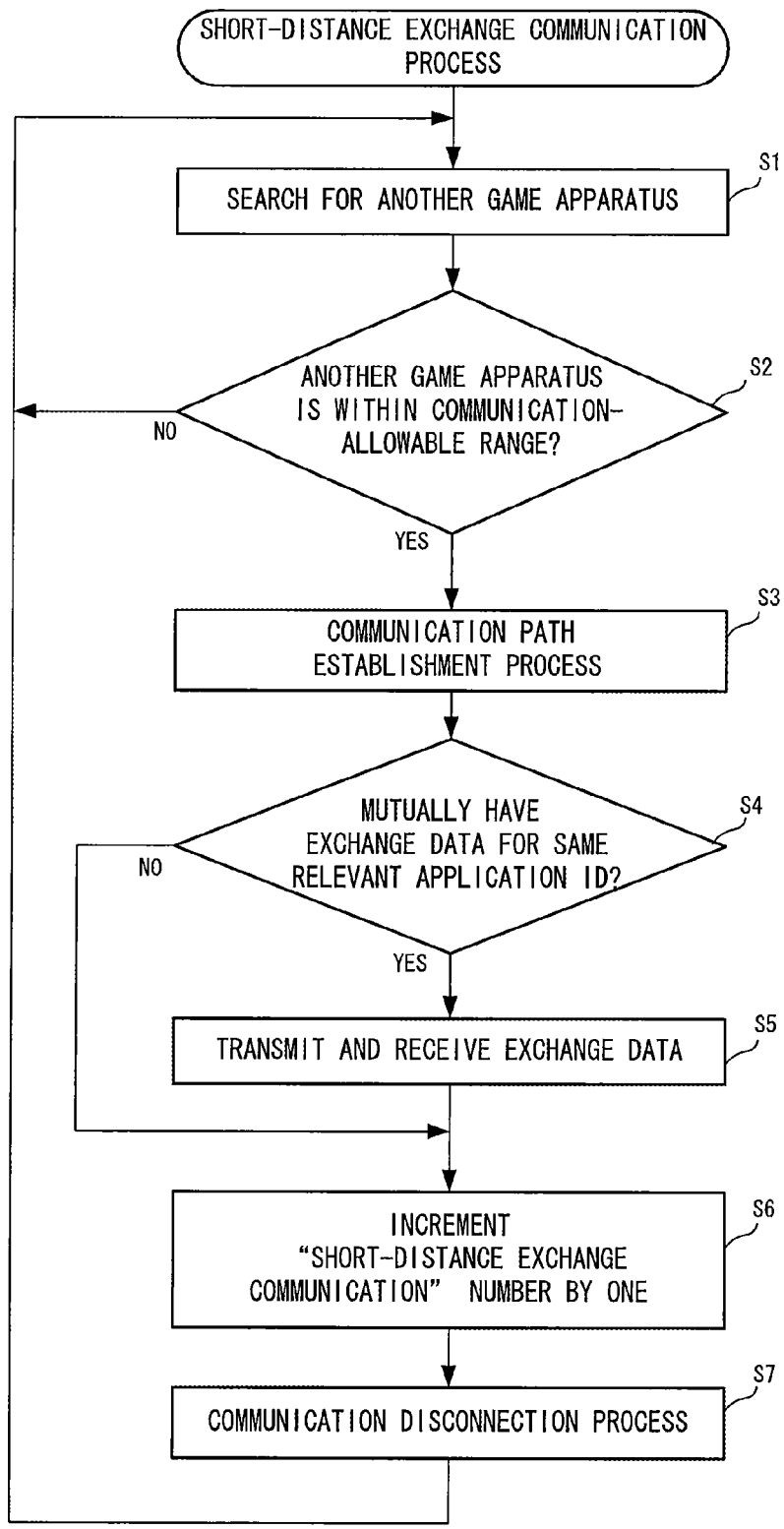
Figure 7:
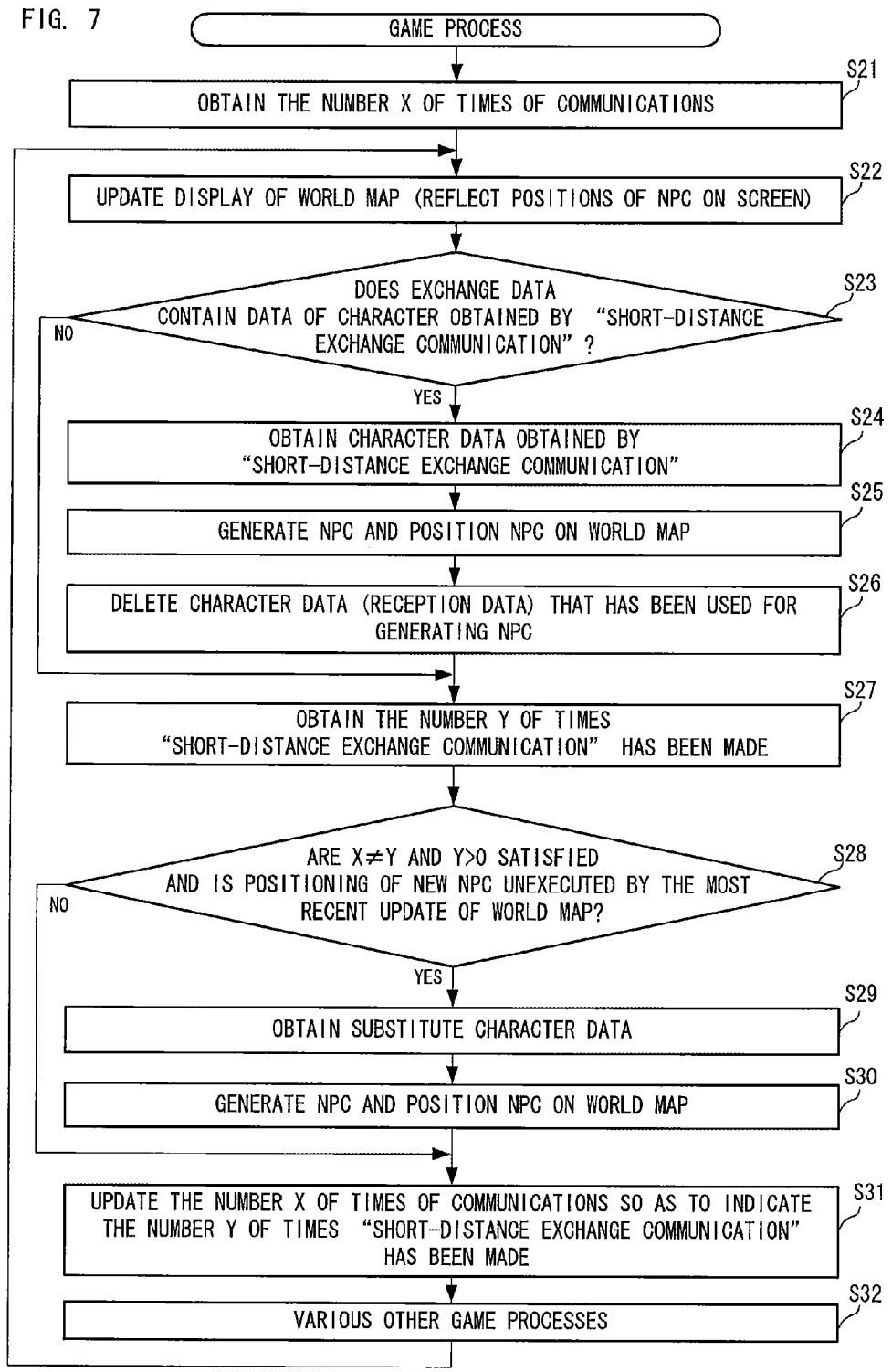
FIG. 7 is a flow chart showing a non-limiting exemplary process executed by the processor.

Further, in the exemplary embodiment, one information processing apparatus (the hand-held game apparatus 10) executes a plurality of processes shown in FIG. 6 and FIG. 7. However, in another exemplary embodiment, a plurality of information processing apparatuses (for example, the hand-held game apparatus 10 and the server device) may share and execute the plurality of processes. Further, the plurality of processes shown in FIG. 6 and FIG. 7 may be executed by one computer (the processor 13), or may be shared and executed by a plurality of computers. Moreover, some or the entirety of the plurality of processes may be implemented by a dedicated circuit.

Furthermore, in the exemplary embodiment, an exemplary case is described in which the hand-held game apparatus is used. However, the exemplary embodiment is not limited thereto. The exemplary embodiment is also applicable to, for example, hand-held information terminals, tablet terminals, and personal computers that can communicate with other information processing apparatuses.

While the exemplary embodiment has been described in detail, the foregoing description is in all aspects illustrative and not restrictive. It will be understood that numerous other modifications and variations can be devised without departing from the scope of the exemplary embodiment.

What is claimed is:

1. A non-transitory computer-readable storage medium having stored therein an information processing program that causes a computer of an information processing apparatus having a communication function to function as:
    an object data storing section configured to store object data that can be used in a predetermined application;
    a communication section configured to make communication with another unspecified information processing apparatus that is within a predetermined range, by using the communication function;
    a communication execution determination section configured to determine whether or not the communication with the other unspecified information processing apparatus that is within the predetermined range has been made by the communication section; and a controller configured to perform control in a case where the communication execution determination section determines that the communication with the other information processing apparatus has been made such that, when object data that can be used in the predetermined application is received by the communication, an object based on the object data having been received is caused to appear in a virtual space, and when object data that can be used in the predetermined application is not received by the communication, an object based on the object data previously stored in the object data storing section is caused to appear in the virtual space.

2. The non-transitory computer-readable storage medium having stored therein the information processing program according to claim 1, wherein the communication section includes a searching section configured to search for another unspecified information processing apparatus that is within the predetermined range, by using the communication function, and the communication execution determination section determines whether or not communication with the other information processing apparatus that has been found by the searching section has been made.

3. The non-transitory computer-readable storage medium having stored therein the information processing program according to claim 1, wherein the information processing program causes the computer to further function as an execution data storing section configured to store, in a predetermined storage medium, first information indicating whether or not the communication has been made, and second information indicating whether or not data that can be used in the predetermined application has been received from a communication partner of the communication having been made, the communication execution determination section determines, based on the first information, whether or not the communication with the other information processing apparatus has been made, and the controller determines, based on the second information, whether or not object data that can be used in the predetermined application has been received.

4. The non-transitory computer-readable storage medium having stored therein the information processing program according to claim 3, wherein the first information represents data indicating the number of times the communication with the other information processing apparatus has been made, and the second information indicates whether or not the object data has been received.

5. The non-transitory computer-readable storage medium having stored therein the information processing program according to claim 1, wherein the object data storing section previously stores data of a first object that is caused to appear in the virtual space by the predetermined application being executed, and data of a second object that does not appear in the virtual space by the predetermined application being simply executed, and the controller causes the second object to appear in the virtual space when the communication execution determination section determines that the communication with the other information processing apparatus has been made, and object data that can be used in the predetermined application has not been received by the communication.

6. The non-transitory computer-readable storage medium having stored therein the information processing program according to claim 1, wherein objects that appear in the virtual space are classified into a first type of objects that appear in the virtual space by the predetermined application being executed regardless of a determination result from the communication execution determination section, and a second type of objects that do not appear in the virtual space by the predetermined application being simply executed, and the controller causes the second type of objects to appear in the virtual space based on the object data having been received, or the object data previously stored in the object data storing section, when the communication execution determination section determines that the communication with the other information processing apparatus has been made.

7. The non-transitory computer-readable storage medium having stored therein the information processing program according to claim 1, wherein the controller includes an object using processor configured to execute a predetermined process using an object that is caused to appear in the virtual space, and the object using processor is capable of using either one of an object based on the object data having been received, and an object based on the object data previously stored in the object data storing section, to execute the predetermined process.

8. The non-transitory computer-readable storage medium having stored therein the information processing program according to claim 1, wherein the object data received by the communication is object data generated by a user, and the object data previously stored in the object data storing section is preset object data that is different from the object data generated by the user.

9. An information processing apparatus having a communication function, the information processing apparatus comprising:

an object data storing section configured to store object data that can be used in a predetermined application;

a communication section configured to make communication with another unspecified information processing apparatus that is within a predetermined range, by using the communication function;

a communication execution determination section configured to determine whether or not the communication with the other unspecified information processing apparatus that is within the predetermined range has been made by the communication section; and a controller configured to perform control in a case where the communication execution determination section determines that the communication with the other information processing apparatus has been made such that, when object data that can be used in the predetermined application is received by the communication, an object based on the object data having been received is caused to appear in a virtual space, and when object data that can be used in the predetermined application is not received by the communication, an object based on the object data previously stored in the object data storing section is caused to appear in the virtual space.

10. An information processing system having a communication function, the information processing system comprising:
   an object data storage medium configured to store object data that can be used in a predetermined application;
   a computer processing system, comprising at least one computer processor, the computer processing system being configured to:
      make communication with another unspecified information processing system that is within a predetermined range, by using the communication function;
      determine whether or not the communication with the other unspecified information processing system that is within the predetermined range has been made by the computer processing system; and
      perform control in a case where the computer processing system determines that the communication with the other information processing system has been made such that, when object data that can be used in the predetermined application is received by the communication, an object based on the object data having been received is caused to appear in a virtual space, and when object data that can be used in the predetermined application is not received by the communication, an object based on the object data previously stored in the object data storage medium is caused to appear in the virtual space.

11. An information processing method used in a computer of an information processing system having a communication function, the information processing method comprising:
   storing object data that can be used in a predetermined application;
   making communication with another unspecified information processing system that is within a predetermined range, by using the communication function;
   determining whether or not the communication with the other unspecified information processing system that is within the predetermined range has been made; and
   performing control in a case where the determining step determines that the communication with the other information processing system has been made such that, when object data that can be used in the predetermined application is received by the communication, an object based on the object data having been received is caused to appear in a virtual space, and when object data that can be used in the predetermined application is not received by the communication, an object based on the object data previously stored in the object data storing section is caused to appear in the virtual space.

12. The information processing system according to claim 10, wherein the computer processing system is further configured to:
   search for another unspecified information processing apparatus that is within the predetermined range, by using the communication function, and
   determine whether or not communication with the other information processing apparatus that has been found by the search has been made.

13. The information processing system according to claim 10, wherein the computer processing system is further configured to:
   store, in a predetermined storage medium, first information indicating whether or not the communication has been made, and second information indicating whether or not data that can be used in the predetermined application has been received from a communication partner of the communication having been made,
   determine, based on the first information, whether or not the communication with the other information processing apparatus has been made, and
   determine, based on the second information, whether or not object data that can be used in the predetermined application has been received.

14. The information processing system according to claim 13, wherein the first information represents data indicating the number of times the communication with the other information processing apparatus has been made, and the second information indicates whether or not the object data has been received.

15. The information processing system according to claim 10, wherein
   the object data storage medium previously stores data of a first object that is caused to appear in the virtual space by the predetermined application being executed, and data of a second object that does not appear in the virtual space by the predetermined application being simply executed, and
   wherein the computer processing system is further configured to cause the second object to appear in the virtual space when the computer processing system determines that the communication with the other information processing apparatus has been made, and object data that can be used in the predetermined application has not been received by the communication.

16. The information processing system according to claim 10, wherein
   objects that appear in the virtual space are classified into a first type of objects that appear in the virtual space by the predetermined application being executed regardless of a determination result from the computer processing system, and a second type of objects that do not appear in the virtual space by the predetermined application being simply executed, and
   the computer processing system is further configured to: cause the second type of objects to appear in the virtual space based on the object data having been received, or the object data previously stored in the object data storage medium, when the computer processing system determines that the communication with the other information processing apparatus has been made.

17. The information processing system according to claim 10, wherein the computer processing system is further configured to:
   execute a predetermined process using an object that is caused to appear in the virtual space, and
   use either one of an object based on the object data having been received, and an object based on the object data previously stored in the object data storage medium, to execute the predetermined process.

18. The information processing system according to claim 10, wherein
   the object data received by the communication is object data generated by a user, and the object data previously stored in the object data storage medium is preset object data that is different from the object data generated by the user.

19. The information processing system according to claim 10, wherein:
   the predetermined application is associated with identifier information; and
   the computer processing system is further configured to determine whether or not the identifier information is the same between the information processing system and the other information processing system, and communicate the object data that can be used in the predetermined application only if a determination that the identifier information is the same is made.

20. The non-transitory computer-readable storage medium according to claim 1 wherein:

the predetermined application is associated with identifier information;

the information processing program causes the computer of the information processing apparatus to determine whether or not the identifier information is the same between the information processing system and the other information processing system, and communicate the object data that can be used in the predetermined application only if a determination that the identifier information is the same is made.

* * * * *